US011417879B2

(12) United States Patent
Takamori et al.

(10) Patent No.: US 11,417,879 B2
(45) Date of Patent: Aug. 16, 2022

(54) POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Kenji Takamori, Fukui (JP); Takashi Arimura, Tsukuba (JP); Yasutaka Iida, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 94 days.

(21) Appl. No.: 16/328,657

(22) PCT Filed: Aug. 31, 2017

(86) PCT No.: PCT/JP2017/031392
§ 371 (c)(1),
(2) Date: Feb. 26, 2019

(87) PCT Pub. No.: WO2018/043653
PCT Pub. Date: Mar. 8, 2018

(65) Prior Publication Data
US 2020/0411854 A1    Dec. 31, 2020

(30) Foreign Application Priority Data

Aug. 31, 2016   (JP) .............................. JP2016-169817

(51) Int. Cl.
*H01M 4/505*    (2010.01)
*H01M 4/525*    (2010.01)
(Continued)

(52) U.S. Cl.
CPC ........... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ....... H01M 10/0525; H01M 2004/021; H01M 2004/028; H01M 4/505
(Continued)

(56) References Cited

U.S. PATENT DOCUMENTS 6,255,020 B1    7/2001   Yamashita et al.
9,130,212 B1    9/2015   Kokado et al.
(Continued)

FOREIGN PATENT DOCUMENTS

CN    1360739 A     7/2002
CN    102779991 A   11/2012
(Continued)

OTHER PUBLICATIONS

Sheng, Y., Investigation of Electrolyte Wetting in Lithium Ion Batteries, 2015, University of Wisconsin Milwaukee UWM Digital Commons, p. 19-22, Chapters 2,4, 6.*
(Continued)

*Primary Examiner* — Jayne L Mershon
(74) *Attorney, Agent, or Firm* — McDermott Will & Emery LLP

(57) ABSTRACT

The present invention relates to a positive electrode active material for a lithium secondary battery, including a lithium composite metal oxide in a form of secondary particles formed by aggregation of primary particles, wherein the
(Continued)

secondary particles have voids in interior thereof and a number of the voids with cross section thereof present per 1 µm² of cross section of the secondary particles is 0.3 or more and 15 or less.

12 Claims, 4 Drawing Sheets

(51) Int. Cl.
    *H01M 10/0525*     (2010.01)
    *H01M 4/02*     (2006.01)

(58) Field of Classification Search
    USPC .......................................................... 429/223
    See application file for complete search history.

(56) References Cited

U.S. PATENT DOCUMENTS

| | | | |
|---|---|---|---|
| 2005/0123832 A1 | 6/2005 | Tsukuma et al. | |
| 2011/0305955 A1 | 12/2011 | Song et al. | |
| 2012/0258358 A1 | 10/2012 | Yura et al. | |
| 2012/0282525 A1 | 11/2012 | Nagai et al. | |
| 2014/0377660 A1 | 12/2014 | Fukui et al. | |
| 2016/0028072 A1 * | 1/2016 | Sakai | H01M 4/131 429/223 |
| 2016/0036041 A1 | 2/2016 | Uwai et al. | |
| 2016/0372749 A1 * | 12/2016 | Iida | H01M 4/505 |
| 2017/0346071 A1 * | 11/2017 | Ogata | H01M 10/052 |

FOREIGN PATENT DOCUMENTS

| | | | | |
|---|---|---|---|---|
| CN | 105378987 A | | 3/2016 | |
| JP | H10-074517 A | | 3/1998 | |
| JP | 2002-075365 A | | 3/2002 | |
| JP | 2004-083388 A | | 3/2004 | |
| JP | 2004-253174 A | | 9/2004 | |
| JP | 2005-158624 A | | 6/2005 | |
| JP | 2007-258187 A | | 10/2007 | |
| JP | 2009-259605 A | | 11/2009 | |
| JP | 2010-080394 A | | 4/2010 | |
| JP | 2011-119092 A | | 6/2011 | |
| JP | 2011119092 A | * | 6/2011 | ........... C01G 53/006 |
| JP | 2011-192445 A | | 9/2011 | |
| JP | 2011192445 A | * | 9/2011 | |
| JP | 2012-004109 A | | 1/2012 | |
| JP | 2012-059416 A | | 3/2012 | |
| JP | 2012059416 A | * | 3/2012 | |
| JP | 2012-079464 A | | 4/2012 | |
| JP | 2013-147416 A | | 8/2013 | |
| JP | 2015-076397 A | | 4/2015 | |
| JP | 2016-025041 A | | 2/2016 | |
| WO | 2012/137391 A1 | | 10/2012 | |
| WO | 2014/142279 A1 | | 9/2014 | |
| WO | WO-2014142279 A1 | * | 9/2014 | ........... H01M 4/505 |
| WO | 2015/108163 A1 | | 7/2015 | |
| WO | 2016/060451 A1 | | 4/2016 | |

OTHER PUBLICATIONS

International Search Report issued in corresponding International Patent Application No. PCT/JP2017/031392, dated Oct. 10, 2017, with English Translation.
Japanese Office Action Reasons for Refusal issued in corresponding Japanese Patent Application No. 2016-169817, dated Aug. 8, 2017, with English Translation.
Japanese Office Action Decision of Refusal issued in corresponding Japanese Patent Application No. 2016-169817, dated Nov. 7, 2017, with English Translation.
Japanese Office Action Reasons for Refusal issued in corresponding Japanese Patent Application No. 2016-169817, dated Mar. 13, 2018, with English Translation.
Extended European Search Report issued in corresponding European Patent Application No. 17846657.9, dated Mar. 13, 2020.
Korean Third Pary Observation issued in corresponding Korean Patent Application No. 10-2019-7005641, dated Dec. 23, 2020, with partial English translation.
European Third Party Observation issued in corresponding European Patent Application No. 17846657.9, dated Jan. 27, 2021.
Chinese Third Party Observation issued in corresponding Chinese Patent Application No. 201780051656.8, dated Jan. 11, 2021, with partial English translation.
Notification of the First Office Action issued in corresponding Chinese Patent Application No. 201780051656.8, dated Jun. 2, 2021 w/Machine English Translation.
Korean Notification of Reason for Refusal issued in corresponding Korean Patent Application No. 10-2019-7005641, dated Oct. 14, 2021, with English translation.
Chinese Second Office Action issue in corresponding Chinese Patent Application No. 201780051656.8, dated Jan. 3, 2022, with English translation.
Korean Decision of Rejection issued in corresponding Korean Patent Application No. 10-2019-7005641, dated Mar. 21, 2022, with English translation.
Chinese Decision of Rejection issued in corresponding Chinese Patent Application No. 201780051656.8, dated Jun. 6, 2022, with English translation.

\* cited by examiner

POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE

This application is the U.S. National Phase under 35 U.S.C. § 371 of International Application No. PCT/JP2017/031392, filed on Aug. 31, 2017, which claims the benefit of Japanese Application No. 2016-169817, filed on Aug. 31, 2016, the entire contents of each are hereby incorporated by reference.

TECHNICAL FIELD

The present invention relates to a positive electrode active material for lithium secondary batteries, a positive electrode for lithium secondary batteries and a lithium secondary battery.

Priority is claimed on Japanese Patent Application No. 2016-169817, filed Aug. 31, 2016, the contents of which are incorporated herein by reference.

BACKGROUND ART

Lithium-containing composite oxides are used as positive electrode active materials for lithium secondary batteries. Lithium secondary batteries have already been put to practical use not only as compact power supplies for portable telephones, notebook computers and the like, but also as medium- or large-sized power supplies for automobile use, electric power storage use, etc.

With a view to improving the performance of lithium secondary batteries, such as the battery capacity, attempts have been made that focus on the porosity of the positive electrode active material for a lithium secondary battery (for example, Patent Documents 1 to 4).

PRIOR ART REFERENCES

Patent Document

Patent Document 1: Japanese Unexamined Patent Application Publication No. 2007-258187
Patent Document 2: International Patent Application Publication No. 2015/108163
Patent Document 3: Japanese Unexamined Patent Application Publication No. 2016-25041
Patent Document 4: Japanese Unexamined Patent Application Publication No. 2010-80394

SUMMARY OF THE INVENTION

Problems to be Solved by the Invention

As the application fields of lithium secondary batteries are expanding, positive electrode active materials for lithium secondary batteries are required to have further improved capacity retention.

However, in the positive electrode active materials for lithium secondary batteries as described in Patent Documents 1 to 4, there is room for improvement from the viewpoint of improvement of the capacity retention in high temperature cycles.

The present invention has been made in view of the above circumstances, and it is an object of the present invention to provide a positive electrode active material for a lithium secondary battery exhibiting excellent capacity retention in high temperature cycles, a positive electrode for a lithium secondary battery using the positive electrode active material for a lithium secondary battery, and a lithium secondary battery having the positive electrode for a lithium secondary battery.

Means to Solve the Problems

Specifically, the present invention is as enumerated in [1] to [10] below.

[1] A positive electrode active material for a lithium secondary battery, including a lithium composite metal oxide in a form of secondary particles that are aggregates of primary particles, wherein the secondary particles have voids in interior thereof and a number of the voids with cross section thereof present per 1 µm² of cross section of the secondary particles is 0.3 or more and 15 or less.

[2] The positive electrode active material according to [1], which has at least one centroid of cross section of the void at each of a middle portion and a surface portion in the cross section of the secondary particles, and wherein an void cross-sectional area ratio in the surface portion in terms of an ratio of cross-sectional area of the void in the surface portion of the secondary particle to cross-sectional area of the surface portion of the secondary particle is 0.75% or more and 50% or less, wherein the surface portion is an area excluding the middle portion which is a circle having a radius of A/4 wherein A is an average particle diameter, $D_{50}$, of the positive electrode active material as a whole measured by laser diffraction type particle size distribution measurement, and a center of the circle is the centroid of cross section of the secondary particle calculated by image processing.

[3] The positive electrode active material according to [2], wherein a void cross-sectional area ratio in the middle portion in terms of a ratio of cross-sectional area of the void in the middle portion of the secondary particle to the cross-sectional area of the middle portion of the secondary particle is 0.1% or more and 65% or less.

[4] The positive electrode active material according to [2] or [3], wherein a ratio of the void cross-sectional area ratio in the middle portion of the secondary particle to the void cross-sectional area ratio in the surface portion of the secondary particle is 0.1 or more and 25 or less.

[5] The positive electrode active material according to any one of [1] to [4], wherein a void cross-sectional area ratio in entire particle cross section in terms of a ratio of cross-sectional area of the void present in the cross section of the secondary particle to the cross-sectional area of the secondary particle is 1% or more and 50% or less.

[6] The positive electrode according to any one of [1] to [5], which has a NMP liquid retention of 18% or more, wherein the NMP liquid retention ratio is determined by equation (1) below:

$$\text{NMP liquid retention (\%)} = [C/B] \times 100 \qquad (1),$$

wherein B is a NMP absorption amount when the positive electrode active material in a dried form is impregnated with NMP, and C is a NMP content when the positive electrode active material impregnated with NMP is dried at 60° C. for 30 minutes.

[7] The positive electrode active material according to any one of [1] to [6], which is represented by composition formula (I) below:

$$\mathrm{Li}[\mathrm{Li}_x(\mathrm{Ni}_a\mathrm{Co}_b\mathrm{Mn}_c\mathrm{M}_d)_{1-x}]\mathrm{O}_2 \quad (I),$$

wherein $-0.1 \leq x \leq 0.2$, $0 < a \leq 1$, $0 \leq b \leq 0.4$, $0 \leq c \leq 0.4$, $0 \leq d \leq 0.1$, a+b+c+d=1, and M represents at least one element selected from the group consisting of Fe, Cr, Cu, Ti, B, Mg, Al, W, Mo, Nb, Zn, Sn, Zr, Ga and V.

[8] The positive electrode active material according to [7], wherein the composition formula (I) is composition formula (I)-1 below:

$$\mathrm{Li}[\mathrm{Li}_x(\mathrm{Ni}_a\mathrm{Co}_b\mathrm{Mn}_c\mathrm{M}_d)_{1-x}]\mathrm{O}_2 \quad (I)\text{-}1,$$

wherein $-0.1 \leq x \leq 0.2$, $0 < a \leq 0.7$, $0 \leq b \leq 0.4$, $0 \leq c \leq 0.4$, $0 \leq d \leq 0.1$, a+b+c+d=1, and M represents at least one element selected from the group consisting of Fe, Cr, Cu, Ti, B, Mg, Al, W, Mo, Nb, Zn, Sn, Zr, Ga and V.

[9] A positive electrode for a lithium secondary battery, including the positive electrode active material of any one of [1] to [8].

A lithium secondary battery, including the positive electrode of [9].

Effect of the Invention

The present invention can provide a positive electrode active material for a lithium secondary battery exhibiting excellent capacity retention in high temperature cycles, a positive electrode for a lithium secondary battery using the positive electrode active material for a lithium secondary battery, and a lithium secondary battery having the positive electrode for a lithium secondary battery.

DESCRIPTION OF THE EMBODIMENTS

Figure 1A:
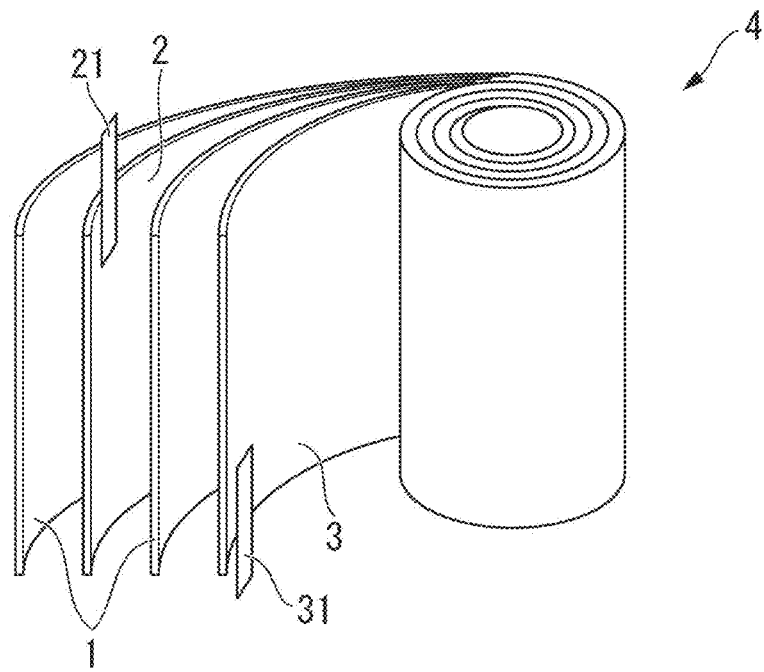
FIG. 1A is a schematic view showing one example of a lithium ion secondary battery.

<Positive Electrode Active Material for Lithium Secondary Battery>

The present invention relates to a positive electrode active material for a lithium secondary battery (hereinafter also referred to as "positive electrode active material"), including a lithium composite metal oxide in a form of secondary particles that are aggregates of primary particles, wherein the secondary particles have voids in interior thereof and a number of the voids with cross section thereof present per 1 $\mu m^2$ of cross section of the secondary particles is 0.3 or more and 15 or less.

The positive electrode active material of the present embodiment is characterized in that the active material has voids in the middle portion and surface portion of the secondary particles, and a specific number of the void cross sections are present at approximately center of the cross section of the secondary particle. The presence of a specific number of void cross sections at approximately center of the cross section of the secondary particles can be inferred to indicate that multiple voids are present dispersedly inside the secondary particles. The presence of appropriately dispersed voids in the surface portion and the middle portion increases the contact area with the electrolytic solution. For this reason, desorption (charging) and insertion (discharge) of lithium ions proceed easily inside the secondary particles. Therefore, the positive electrode active material of the present embodiment is excellent in capacity retention in high temperature cycles.

In the present specification, the term "primary particle" means the minimum unit observed as an independent particle by SEM, and the particle is a single crystal or a polycrystal in which crystallites are assembled.

In the present specification, the term "secondary particle" means a particle formed by aggregation of primary particles and can be observed by SEM.

<<Method for Determining Cross-Sectional Structure of Secondary Particle>>

The method for determining the cross-sectional structure of the secondary particle contained in the positive electrode active material in the present embodiment will be described below.

Initially, the positive electrode active material is processed to obtain a cross section. As a method of obtaining a cross section, a method in which the positive electrode active material is processed with a focused ion beam processing apparatus to obtain a cross section can be mentioned. Alternatively, a part of the positive electrode prepared using the positive electrode active material may be cut out and processed with an ion milling apparatus to obtain a cross section of the positive electrode active material contained in the electrode mix layer.

As a specimen subjected to the cross-section processing, not only the positive electrode active material powder and the electrode, but also a material obtained by solidifying the positive electrode active material powder with a resin, etc. can be selected as appropriate. Further, not only the ion beam method but also polishing and the like can be selected as appropriate as a method for producing the cross section.

Next, using a scanning electron microscope or a focused ion beam processing apparatus, the cross section of the positive electrode active material obtained by the above processing is observed with a secondary electron image. A cross section of a secondary particle of the positive electrode active material is selected, which has a maximum diameter close to a volume-based 50% cumulative particle diameter $D_{50}$ (μm) obtained by laser diffraction type particle size distribution measurement, and which has a minimum diameter/maximum diameter ratio of more than 0.5. A secondary electron image of the selected cross section of the secondary particle is taken at the maximum magnification at which the entire secondary particle is shown within the frame, thereby obtaining the cross-sectional image of the secondary particle.

In the present specification, the term "maximum diameter" means the longest diameter among all diameters (lengths) of the cross section of the secondary particle of the positive electrode active material in the SEM observation thereof.

In the present specification, the term "minimum diameter" means the shortest diameter among all diameters (lengths) of the cross section of the secondary particle of the positive electrode active material in the SEM observation thereof.

The cross section of the electrode active material having a maximum diameter close to the volume-based 50% cumulative particle size $D_{50}$ (μm) specifically means a cross section of the electrode active material having a maximum diameter that is within a range of 50 to 200% of the volume-based 50% cumulative particle diameter $D_{50}$ (μm).

Figure 3A:
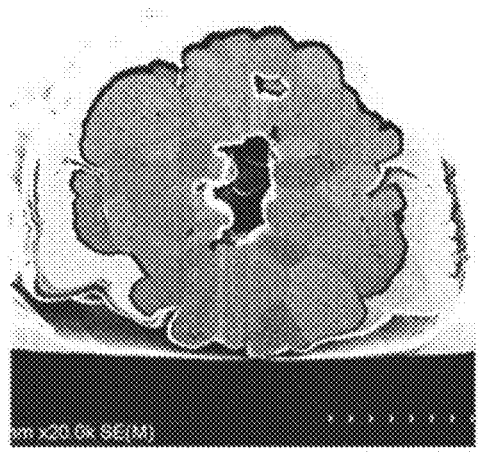
FIG. 3A is an image (hereinafter also referred to as SEM image) obtained by observing a cross section of a secondary particle with a scanning electron microscope (hereinafter also referred to as SEM).

An example of the cross-sectional image of the secondary particle is shown in FIG. 3A.

In the present specification, the $D_{50}$ (μm) of the positive electrode active material denotes a value measured by the following method (laser diffraction scattering method).

The particle size distribution measurement was performed using a laser diffraction particle size analyzer (LA-950, manufactured by Horiba, Ltd.) with respect to a dispersion obtained by charging 0.1 g of a powder of the lithium metal composite oxide into 50 ml of a 0.2% by mass aqueous sodium hexametaphosphate solution so as to disperse the powder in the solution. The obtained dispersion is subjected to a particle size distribution measurement, whereby a volume-based cumulative particle size distribution curve is obtained. In the obtained cumulative particle size distribution curve, the particle diameter ($D_{50}$) at a 50% cumulation measured from the smaller particle side is the value of $D_{50}$ (μm) described above.

The cross-sectional image is input into a computer, binarized with an intermediate value between the maximum luminance and the minimum luminance in the cross-sectional image of the secondary particle using an image analysis software, and a binarized image is obtained while converting the color of inside of the cross section of the secondary particle into black and converting the color of cross sections of voids present inside the cross section of the secondary particle into white. In this process, the cross-sectional image is visually observed to confirm that there is no discrepancy between the inside of the cross section and the cross sections of the voids. If any discrepancy is found, the threshold value for binarization processing should be adjusted.

It is supposed that the cross sections of the voids present within the cross section have an area of 0.01 μm² or more. As the image analysis software, Image J, Photoshop, etc. can be selected appropriately.

Figure 3B:
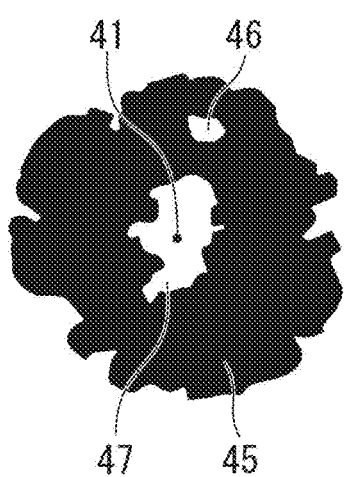
FIG. 3B is a schematic view of a cross section of a secondary particle.

More specifically, the cross-sectional image of the secondary particle shown in FIG. 3A is input into a computer and processed by the above method using an image analysis software to obtain a binarized image shown in FIG. 3B.

With respect to the binarized image, a centroidal position and an area of the cross section of the secondary particle are calculated using an image analysis software. Also, the number of the cross sections of the voids (void cross sections) present within the cross section of the secondary particle, and the centroidal position, area and maximum diameter of each of the void cross sections are also calculated.

In the present embodiment, the cross section of the secondary particle (secondary particle cross section) refers to a region surrounded by the outer periphery of the secondary particle, that is, the entire cross section of the secondary particle, and includes both black and white portions in the binarized image. The centroidal position refers to a position which is the center of the mass of the pixels included in the area surrounded by the outer periphery on the premise that the pixels constituting the image have the same mass.

More specific explanations are made below with reference to FIG. 3B. Reference numeral 41 in FIG. 3B denotes the centroidal position of the cross section of the secondary particle. Reference numeral 42 in FIG. 2 denotes the centroidal position of the void cross section. In FIG. 3B, there are two void cross sections, denoted by reference numerals 46 and 47.

For determining the number of void cross sections per 1 μm² of the secondary particle cross section, the ratio of the number of void cross sections to the area of the secondary particle cross section calculated above (number of void cross sections/sum of the areas of the black and white portions of the secondary particle cross section) is calculated.

In the present embodiment, the number of void cross sections per 1 μm² of the area of the secondary particle cross section (sum of the areas of the black and white portions shown in FIG. 3B) is 0.3 or more and 15 or less, preferably 0.5 or more and 14 or less, more preferably from 0.7 or more and 13 or less, and particularly preferably from 1.0 or more and 12 or less.

It can be inferred that, when the number of void cross sections per 1 μm² is not less than the above lower limit value, the voids are dispersedly present in the middle portion and the surface portion of the secondary particles. As a result, it is possible to provide a positive electrode active material for a lithium secondary battery excellent in capacity retention in high temperature cycles. Further, when the number of void cross sections per 1 μm² is not more than the above upper limit value, it is possible to provide a positive electrode active material for a lithium secondary battery having high volumetric energy density.

The upper limit value and the lower limit value of the number of void cross sections per 1 μm² can arbitrarily be combined.

In one aspect of the present invention, the number of the void cross sections per 1 μm² is preferably 2.0 or more and 11 or less, more preferably 2.5 or more and 10 or less, and still more preferably 4.0 or more and 9.0 or less.

In the present embodiment, the amount of the positive electrode active material for a lithium secondary battery having the number of void cross section per 1 μm² relative to the total mass of the positive electrode active material for a lithium secondary battery is not particularly limited, but the amount is preferably 10% by mass or more and 100% by mass or less, more preferably 30% by mass or more and 100% by mass or less, and still more preferably 50% by mass or more and 100% by mass or less.

The above preferable amount is also applicable as a preferable amount relative to the total mass of the positive electrode active material for a lithium secondary battery in the case of the positive electrode active material for a lithium secondary battery of another embodiment described below.

Next, explanations are made with respect to the middle portion and the surface portion of the secondary particle cross section. With the volume-based 50% cumulative particle size $D_{50}$ (μm) obtained by the laser diffraction type particle size distribution measurement being defined as A and the centroid of the secondary particle cross section calculated by image analysis being supposed as a center, a circle is drawn so as to have a radius of A/4. The inside of the circle is defined as the middle portion of the particle, and the outside of the circle is defined as the surface portion of the particle.

Figure 2:
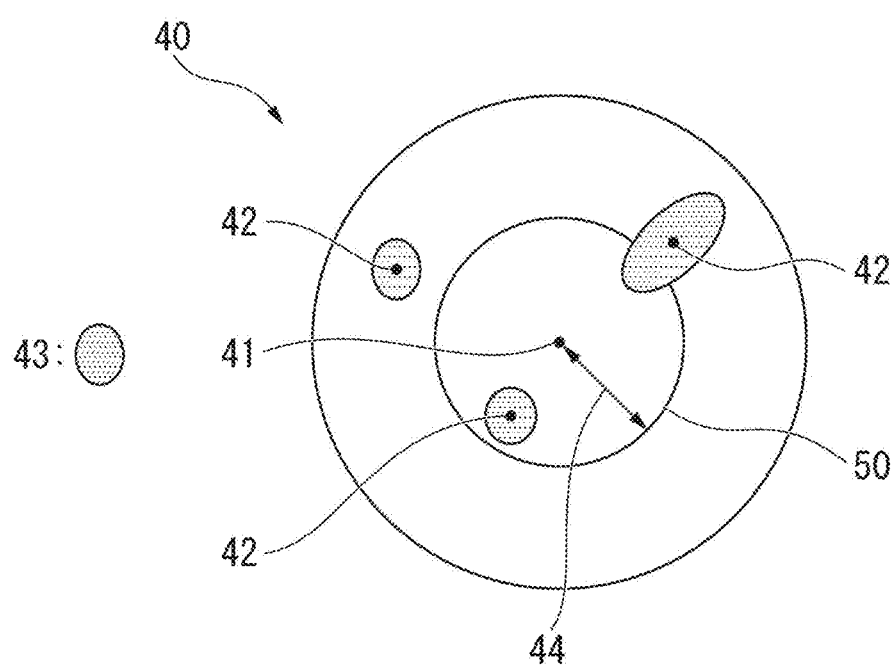
FIG. 2 is a schematic view of a cross section of a secondary particle.

FIG. 2 is a schematic view of a cross section of a secondary particle. The volume-based 50% cumulative particle size $D_{50}$ (μm) obtained by the laser diffraction type particle size distribution measurement in the secondary particle cross section 40 is defined as A. A circle 50 is drawn with its center being the centroidal position 41 of the secondary particle cross section calculated by image analysis so as to have a radius (indicated by reference numeral 44) of A/4. Here, the inside of the circle 50 is defined as the middle portion of the particle, and the outside of the circle 50 is defined as the surface portion of the particle. In FIG. 2, reference numeral 43 denotes a void cross section, and reference numeral 42 denotes the centroid of the void cross section.

In the present embodiment, for obtaining a positive electrode active material for a lithium secondary battery excellent in capacity retention in high temperature cycles, it is preferable that at least one centroid of the void cross section is present at each of the middle portion and the surface portion in the cross section 40 of the secondary particle. For obtaining a positive electrode active material for a lithium secondary battery with higher discharge capacity at high current rate, the void cross-sectional area ratio in the surface portion of the secondary particle, i.e., area ratio of the void cross section in the surface portion of the secondary particle to the cross section of the surface portion of the secondary particle, is preferably 0.75% or more, more preferably 1% or more, and particularly preferably 1.2% or more. For obtaining a positive electrode active material for a lithium secondary battery having high volumetric energy density, the void cross-sectional area ratio in the surface portion of the secondary particle is preferably 50% or less, more preferably 40% or less, and particularly preferably 30% or less.

The upper limit value and the lower limit value of the void cross-sectional area ratio in surface portion of the secondary particle can arbitrarily be combined.

For example, the void cross-sectional are ratio in the surface portion of the secondary particle is preferably 0.75% or more and 50% or less, more preferably 1% or more and 40% or less, and more preferably 1.2% or more and 30% or less.

The ratio of the void cross-sectional area ratio in the surface portion of the secondary particle is a value calculated as an area ratio of the void cross section present in the surface portion of the secondary particle to the cross section of the surface portion of the secondary particle (area of the white portion of the surface portion of the particle/sum of the areas of the black and white portions of the surface portion of the particle×100).

In one aspect of the present invention, the void cross-sectional area ratio in the surface portion of the secondary particle is preferably 10% or more and 40% or less, more preferably 15% or more and 30% or less.

In the present embodiment, for obtaining a positive electrode active material for a lithium secondary battery with higher discharge capacity at high current rate, the void cross-sectional area ratio in the middle portion of the secondary particle, i.e., area ratio of the void cross section in the middle portion of the secondary particle to the cross section of the middle portion of the secondary particle, is preferably 0.1% or more, more preferably 1% or more, and particularly preferably 5% or more. For obtaining a positive electrode active material for a lithium secondary battery having high cycle performance, the void cross-sectional area ratio in the middle portion of the secondary particle is preferably 65% or less, more preferably 60% or less, and particularly preferably 55% or less.

The upper limit value and the lower limit value of the void cross-sectional area ratio in middle portion of the secondary particle can arbitrarily be combined.

For example, the void cross-sectional are ratio in the middle portion of the secondary particle is preferably 0.1% or more and 65% or less, more preferably 1% or more and 60% or less, and even more preferably 5% or more and 55% or less.

In the present specification, the expression "high cycle performance" means that a discharge capacity retention is high. In the present embodiment, the high discharge capacity retention means that the discharge capacity retention in the cycle test performed in the Examples described later is 75% or more.

The ratio of the void cross-sectional area ratio in the middle portion of the secondary particle is a value calculated as an area ratio of the void cross section present in the middle portion of the secondary particle to the cross section of the middle portion of the secondary particle (area of the white portion of the middle portion of the particle/sum of the areas of the black and white portions of the middle portion of the particle×100).

In the present embodiment, for obtaining a positive electrode active material for a lithium secondary battery excellent in capacity retention in high temperature cycles, the ratio of the void cross-sectional area ratio in the middle portion of the secondary particle to the void cross-sectional area ratio in the surface portion of the secondary particle is preferably 0.1 or more, more preferably 0.15 or more, and particularly preferably 0.2 or more. Similarly, for obtaining a positive electrode active material excellent in capacity retention in high temperature cycles, the ratio is preferably 25 or less, more preferably 20 or less, and particularly preferably 15 or less. The upper limit value and the lower limit value of the ratio of the void cross-sectional area ratio in the middle portion of the secondary particle to the void cross-sectional area ratio in the surface portion of the secondary particle can arbitrarily be combined.

It can be inferred that, when the ratio of the void cross-sectional area ratio in the middle portion of the secondary particle to the void cross-sectional area ratio in the surface portion of the secondary particle is within the range specified above, the voids are appropriately dispersed in the middle portion and the surface portion of the secondary particles. As a result, it is possible to provide a positive electrode active material for a lithium secondary battery excellent in capacity retention in high temperature cycles.

For example, the ratio of the void cross-sectional area ratio in the middle portion of the secondary particle to the void cross-sectional area ratio in the surface portion of the secondary particle is preferably 0.1 or more and 25 or less, more preferably 0.15 or more and 20 or less, and more preferably 0.2 or more and 15 or less.

In the present embodiment, for obtaining a positive electrode active material for a lithium secondary battery with higher discharge capacity at low temperature environment, the void cross-sectional area ratio in the entire cross section of the secondary particle, i.e., area ratio of the void cross section in the cross section of the secondary particle to the cross section of the secondary particle, is preferably 1% or more, more preferably 5% or more, and particularly preferably 10% or more. For lowering the hygroscopicity of the positive electrode active material, the void cross-sectional ratio is preferably 50% or less, more preferably 40% or less, and particularly preferably 30% or less.

For example, the void cross-sectional area ratio in the entire cross section of the secondary particle is preferably 1% or more and 50% or less, more preferably 5% or more and 40% or less, and more preferably 10% or more and 30% or less.

The void cross-sectional area ratio in the entire cross section of the secondary particle is a value calculated as an area ratio of the void cross section present in the cross section of the secondary particle to the cross section of the secondary particle (area of the white portion of the cross section of the particle/sum of the areas of the black and white portions of the cross section of the particle×100).

In the present embodiment, for obtaining a positive electrode active material for a lithium secondary battery excellent in capacity retention in high temperature cycles, the positive electrode active material preferably has a NMP liquid retention ratio, as measured by the method described below, of 18% or more, more preferably 20% or more, and particularly preferably 25% or more.

In one aspect of the present invention, the NMP liquid retention ratio is preferably 18% or more and 80% or less, more preferably 20% or more and 75% or less, even more preferably 25% or more and 70% or less.

In another aspect of the present invention, the NMP liquid retention ratio is preferably 30% or more and 80% or less, more preferably 40% or more and 70% or less, and even more preferably 50% or more and 60% or less.

[Method for Measuring NMP Liquid Retention]

The NMP liquid retention is a value calculated by equation (1) below:

$$\text{NMP liquid retention (\%)} = [C/B] \times 100 \qquad (1),$$

wherein B is a NMP absorption amount when the positive electrode active material of the present embodiment in a dried form is impregnated with N-methylpyrrolidone (NMP), and C is a NMP content when the positive electrode active material impregnated with NMP is dried at 60° C. for 30 minutes.

The value of B can be obtained by calculating the difference between the mass of the positive electrode active material (for a lithium secondary battery) after the oil absorption (impregnation with NMP) and the mass of the positive electrode active material before the oil absorption (impregnation with NMP).

The value of C can be obtained by calculating the difference between the mass of the dried positive electrode active material for a lithium secondary battery and the mass of the positive electrode active material before the oil absorption (impregnation with NMP).

As the porosity of the secondary particles increases, the NMP absorption amount increases. Further, it is speculated that when the secondary particles have communicating voids in the surface portion and middle portion thereof, NMP is less likely to escape from the inside of the secondary particles to the outside thereof. Therefore, in the case of particles having such a structure, the NMP liquid retention increases. The positive electrode active material of the present embodiment has moderately dispersed voids in the surface portion and the middle portion of the secondary particles, which enables a high NMP liquid retention as described above.

In the present embodiment, the positive electrode active material is preferably represented by formula (I) below:

$$\text{Li}[\text{Li}_x(\text{Ni}_a\text{Co}_b\text{Mn}_c\text{M}_d)_{1-x}]\text{O}_2 \qquad (I),$$

wherein $-0.1 \leq x \leq 0.2$, $0 < a \leq 1$, $0 \leq b \leq 0.4$, $0 \leq c \leq 0.4$, $0 \leq d \leq 0.1$, $a+b+c+d=1$, and M represents at least one element selected from the group consisting of Fe, Cr, Cu, Ti, B, Mg, Al, W, Mo, Nb, Zn, Sn, Zr, Ga and V.

For obtaining a positive electrode active material for a lithium secondary battery with higher cycle performance, x in the formula (I) is preferably more than 0, more preferably 0.01 or more, and still more preferably 0.02 or more. For obtaining a positive electrode active material for a lithium secondary battery with higher initial coulombic efficiency, x in the formula (I) is preferably 0.1 or less, more preferably 0.08 or less, still more preferably 0.06 or less.

The upper limit values and lower limit values of x can be arbitrarily combined.

For example, x is preferably more than 0 and 0.1 or less, more preferably 0.01 or more and 0.08 or less, and still more preferably 0.02 or more and 0.06 or less.

For obtaining a positive electrode active material for a lithium secondary battery with higher discharge capacity, a in the composition formula (I) is preferably 0.10 or more, more preferably 0.20 or more, and still more preferably 0.30 or more. For obtaining a positive electrode active material for a lithium secondary battery with higher thermal stability, a in the formula (I) is preferably 0.90 or less, more preferably 0.80 or less, still more preferably 0.70 or less.

The upper limit values and lower limit values of a can be arbitrarily combined.

For example, a is preferably 0.10 or more and 0.90 or less, more preferably 0.21 or more and 0.80 or less, and even more preferably 0.30 or more and 0.70 or less.

For obtaining a positive electrode active material for a lithium secondary battery with higher discharge capacity at high current rate, b in the composition formula (I) is preferably 0.05 or more, more preferably 0.10 or more, and still more preferably 0.20 or more. For obtaining a positive electrode active material for a lithium secondary battery having high discharge capacity, b in the composition formula (I) is preferably 0.35 or less, more preferably 0.30 or less, and even more preferably 0.25 or less.

The upper limit values and lower limit values of b can be arbitrarily combined.

For example, b is preferably 0.05 or more and 0.35 or less, more preferably 0.10 or more and 0.30 or less, and still more preferably 0.20 or more and 0.25 or less.

For obtaining a lithium secondary battery with higher cycle performance, c in the formula (I) is preferably 0.05 or more, more preferably 0.10 or more, and still more preferably 0.15 or more. For obtaining a lithium secondary battery with higher storage stability under high temperature conditions (e.g., at 60° C.), c in the formula (I) is preferably 0.35 or less, more preferably 0.30 or less, and still more preferably 0.25 or less.

The upper limit values and lower limit values of c can be arbitrarily combined.

For example, c is preferably 0.05 or more and 0.35 or less, more preferably 0.10 or more and 0.30 or less, and still more preferably 0.15 or more and 0.25 or less.

For improving the handling of the positive electrode active material, d in the formula (I) is preferably more than 0, more preferably 0.001 or more, and still more preferably 0.005 or more. For obtaining a lithium secondary battery with higher discharge capacity at high current rate, d in the composition formula (I) is preferably 0.09 or less, more preferably 0.08 or less, and still more preferably 0.07 or less.

The upper limit values and lower limit values of d can be arbitrarily combined.

For example, d is preferably more than 0 and 0.09 or less, still more preferably 0.001 or more and 0.08 or less, and still more preferably 0.005 or more and 0.07 or less.

M in the composition formula (I) represents one or more elements selected from the group consisting of Fe, Cr, Cu, Ti, B, Mg, Al, W, Mo, Nb, Zn, Sn, Zr, Ga and V.

M in the formula (I) is preferably Ti, B, Mg, Al, W or Zr from the viewpoint of obtaining a positive electrode active material for a lithium secondary battery with higher cycle performance, and is preferably B, Al, W or Zr from the viewpoint of obtaining a positive electrode active material for a lithium secondary battery with higher thermal stability.

In the present embodiment, the composition formula (I) is preferably the following composition formula (I)-1:

$$Li[Li_x(Ni_aCo_bMn_cM_d)_{1-x}]O_2 \quad (I)\text{-}1,$$

wherein $-0.1 \leq x \leq 0.2$, $0 < a \leq 0.7$, $0 \leq b \leq 0.4$, $0 \leq c \leq 0.4$, $0 \leq d \leq 0.1$, $a+b+c+d=1$, and M represents at least one element selected from the group consisting of Fe, Cr, Cu, Ti, B, Mg, Al, W, Mo, Nb, Zn, Sn, Zr, Ga and V.

(BET Specific Surface Area)

In the present embodiment, for obtaining a positive electrode active material for a lithium secondary battery with higher discharge capacity at high current rate, the BET specific surface area (m$^2$/g) of the positive electrode active material is preferably 0.5 m$^2$/g or more, more preferably 0.8 m$^2$/g or more, and even more preferably 1.0 m$^2$/g or more. For lowering the hygroscopicity of the positive electrode active material, the BET specific surface area (m$^2$/g) is preferably 3.0 m$^2$/g or less, more preferably 2.8 m$^2$/g or less, and even more preferably 2.6 m$^2$/g or less.

The upper limit values and lower limit values of the BET specific surface area (m$^2$/g) of the positive electrode active material can be arbitrarily combined.

For example, the BET specific surface area is preferably 0.5 m$^2$/g or more and 3.0 m$^2$/g or less, more preferably 0.8 m$^2$/g or more and 2.8 m$^2$/g or less, and even more preferably 1.0 m$^2$/g or more and 2.6 m$^2$/g or less.

The BET specific surface area (m$^2$/g) in the present embodiment can be measured by Macsorb (registered trademark) manufactured by Mountech Co., Ltd. with respect to 1 g of the lithium metal composite oxide powder that has been dried in a nitrogen atmosphere at 105° C. for 30 minutes.

(Layered Structure)

The crystal structure of the positive electrode active material is a layered structure, and more preferably a hexagonal crystal structure or a monoclinic crystal structure.

The hexagonal crystal structure belongs to any one of the space groups selected from the group consisting of P3, P3$_1$, P3$_2$, R3, P-3, R-3, P312, P321, P3$_1$12, P3$_1$21, P3$_2$12, P3$_2$21, R32, P3 m1, P31m, P3c1, P31c, R3m, R3c, P-31m, P-31c, P-3 m1, P-3c, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P63 cm, P63mc, P-6m2, P-6c2, P-62m, P-62c, P6/mmm, P6/mcc, P6$_3$/mcm, and P6$_3$/mmc.

The monoclinic crystal structure belongs to any one of the space groups selected from the group consisting of P2, P2$_1$, C2, Pm, Pc, Cm, Cc, P2/m, P2$_1$/m, C2/m, P2/c, P2$_1$/c, and C2/c.

Among the aforementioned crystal structures, from the viewpoint of obtaining a lithium secondary battery having high discharge capacity, the especially preferable crystal structure of the positive electrode active material is a hexagonal crystal structure belonging to a space group of R-3m or a monoclinic crystal structure belonging to a space group of C2/m.

[Method for Producing Positive Electrode Active Material]

In producing the positive electrode active material of the present invention, it is preferred that a metal composite compound is first prepared, which includes essential metals other than lithium, i.e., Ni, Co and Mn, and at least one optional element selected from Fe, Cr, Cu, Ti, B, Mg, Al, W, Mo, Nb, Zn, Sn, Zr, Ga and V, and then the metal composite compound is calcinated with a suitable lithium compound. As the metal composite compound, it is preferable to use a metal composite hydroxide or a metal composite oxide. Hereinbelow, as to one example of the method for producing the positive electrode active material, explanations are made separately on the step of producing the metal composite compound and the step of producing the lithium metal composite oxide.

(Step of Producing Metal Composite Compound)

The metal composite compound can be produced by the conventionally known batch co-precipitation method or continuous co-precipitation method. Hereinbelow, the method for producing the metal composite compound is explained taking as an example the case of production of a metal composite hydroxide containing nickel, cobalt and manganese as metals.

First, a nickel salt solution, a cobalt salt solution, a manganese salt solution and a complexing agent are reacted by the co-precipitation method, especially, a continuous method described in Japanese Patent Unexamined Publication No. 2002-201028 to produce a metal composite hydroxide represented by $Ni_aCo_bMn_c(OH)_2$, wherein $a+b+c=1$.

There is no particular limitation with respect to a nickel salt as a solute in the aforementioned nickel salt solution. For example, any of nickel sulfate, nickel nitrate, nickel chloride and nickel acetate can be used. As a cobalt salt as a solute in the cobalt salt solution, for example, any of cobalt sulfate, cobalt nitrate and cobalt chloride can be used. As a manganese salt as a solute in the manganese salt solution, for example, any of manganese sulfate, manganese nitrate and manganese chloride can be used. These metal salts are used in a ratio corresponding to the composition ratio of the aforementioned $Ni_aCo_bMn_c(OH)_2$. That is, the amount of each metal salt is set so that the molar ratio of nickel, cobalt and manganese in a mixed solution containing the metal salts equals an intended ratio of a:b:c. As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine.

The complexing agent may not be used for producing the composite hydroxide. When the complexing agent is used, for example, the molar ratio of the complexing agent relative to the total number of moles of the metal salts is greater than 0 and 2.0 or less. The complexing agent may be added in the form of a mixture thereof with the metal salts, or may be added separately from the solution of the metal salts.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of $Ni_aCo_bMn_c(OH)_2$. The reaction is performed with the temperature in the reaction vessel being regulated, for example, within the range of 20° C. to 80° C., preferably 30° C. to 70° C. and the pH value in the reaction vessel being regulated, for example, within the range of 9 to 13, preferably 11 to 13, while appropriately agitating the content of the reaction vessel. The reaction vessel is one which allows the overflow for separation of the precipitated reaction product.

The inside of the reaction vessel may be an inert atmosphere. In an inert atmosphere, it is possible to suppress aggregation of elements which are more likely to be oxidized than nickel, and to obtain a uniform metal composite hydroxide. Examples of the inert gas include nitrogen, argon, carbon dioxide and the like.

Further, the atmosphere in the reaction vessel preferably contains an appropriate amount of oxygen or an oxidizing agent, while being kept inert. The reason for this is that, by moderately oxidizing the transition metals, it becomes possible to regulate the structure of the metal composite hydroxide so as to regulate the size and dispersion of the voids inside the secondary particles present in the positive electrode active material prepared using the metal composite hydroxide. The oxygen in an oxygen-containing gas or the oxidizing agent may be used in an amount such that sufficient oxygen atoms can be provided for oxidizing the transition metals. Unless too large an amount of oxygen atoms are introduced, the atmosphere in the reaction vessel can be kept inert.

For introducing oxygen into the atmosphere inside the reaction vessel, an oxygen-containing gas may be introduced into the reaction vessel. The oxygen concentration (% by volume) of the oxygen-containing gas is preferably 1 or more and 15 or less. For increasing the homogeneity of the solution in the reaction vessel, an oxygen-containing gas may be bubbled in the solution. Examples of the oxygen-containing gas include oxygen gas, air, and a mixed gas thereof with oxygen-free gas such as nitrogen gas. From the viewpoint of easy adjustment of the oxygen concentration of the oxygen-containing gas, the mixed gas is preferable among those exemplified above.

For causing the oxidizing agent to be present inside the reaction vessel, the oxidizing agent may be added to the reaction vessel. Examples of the oxidizing agent include hydrogen peroxide, chlorate, hypochlorite, perchlorate, permanganate and the like. Hydrogen peroxide is preferably used because impurities are unlikely to be introduced into the reaction system.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting may be washed with weak acid water or an alkaline solution containing sodium hydroxide or potassium hydroxide.

In the above example, a nickel-cobalt-manganese composite hydroxide is produced; however, a nickel-cobalt-manganese composite oxide may be produced instead. The nickel-cobalt-manganese composite oxide can be prepared by, for example, performing a step of bringing the coprecipitate slurry as described above into contact with an oxidizing agent or a step of heat-treating the nickel-cobalt-manganese composite oxide.

(Step for Producing Lithium Metal Composite Oxide)

After drying the metal composite oxide or the metal composite hydroxide, the dried product is mixed with a lithium compound. The drying conditions are not particularly limited, and may be, for example, any of the following conditions: conditions under which the metal composite oxide or the metal composite hydroxide is not oxidized nor reduced (oxides→oxides, hydroxides→hydroxide), conditions under which the metal composite hydroxide is oxidized (hydroxide→oxide), and conditions under which the metal composite oxide is reduced (oxides→hydroxide). For providing conditions which do not cause oxidation nor reduction, it is possible to use an inert gas such as nitrogen or a noble gas (e.g., helium and argon). For providing conditions which oxidize the metal composite hydroxide, the drying may be carried out in an atmosphere of oxygen or air. Further, for providing conditions allowing reduction of the metal composite oxide, a reducing agent such as hydrazine or sodium sulfite may be used in an inert gas atmosphere. As the lithium compound, any of lithium carbonate, lithium nitrate, lithium acetate, lithium hydroxide, lithium hydroxide hydrate and lithium oxide may be used individually or in the form of a mixture of two or more of these lithium compounds.

After drying the metal composite oxide or the metal composite hydroxide, the resulting may be subjected to appropriate classification. The aforementioned lithium salt and the metal composite hydroxide are used in respective amounts determined in view of the composition ratio of the end product. For example, when using a nickel-cobalt-manganese composite hydroxide, the lithium compound and the metal composite hydroxide are used in a ratio corresponding to the composition ratio of $LiNi_aCo_bMn_cO_2$ (wherein, a+b+c=1). By calcining a mixture of the nickel-cobalt-manganese composite hydroxide and the lithium compound, a lithium-nickel-cobalt-manganese composite oxide can be obtained. The calcination may be carried out in dried air, an oxygen atmosphere, an inert atmosphere or the like depending on the desired composition, and may include a plurality of heating steps if necessary.

The temperature for calcination of the aforementioned metal composite oxide or metal composite hydroxide and lithium compounds such as lithium hydroxide or lithium carbonate is not particularly limited; however, for regulating the number of the void cross sections of the positive electrode active material to fall within the range specified in the present invention, the temperature is preferably 600° C. to 1100° C., more preferably 750° C. to 1050° C., and even more preferably 800° C. to 1025° C.

The calcination time is preferably 3 hours to 50 hours. The calcination time exceeding 50 hours does not seriously affect the battery performance but tends to result in substantially lower battery performance due to volatilization of Li. The calcination time less than 3 hours tends to result in a poor crystal growth and an inferior battery performance.

That is, when the calcination time is within 50 hours, the volatilization of Li is suppressed, and the battery performance deterioration can be prevented. When the calcination temperature is 3 hours or more, not only does the growth of crystals proceed satisfactorily, but also the lithium carbonate component and the lithium hydroxide component to be contained in the lithium composite oxide powder can be decreased, whereby the battery performance can be improved. In this embodiment, the calcination time means a time period from the time when the target temperature is reached to the time when the temperature maintenance is finished, that is, a maintenance period. The temperature elevation rate until reaching the target temperature is preferably 30° C./hour to 1200° C./hour, more preferably 60° C./hour to 600° C./hour, and even more preferably 75° C./hour to 500° C./hour.

It is also effective to perform a precalcination in advance of the aforementioned calcination. Such a precalcination is preferably performed at a temperature in the range of 300 to 850° C. for 1 to 10 hours.

The lithium metal composite oxide after the calcination is pulverized and then appropriately classified, thereby obtaining a positive electrode active material applicable to a lithium secondary battery.

<Lithium Secondary Battery>

Next, explanations are made on a positive electrode using the positive electrode active material (for a lithium secondary battery) of the present invention as a positive electrode active material of a lithium secondary battery, and a lithium secondary battery including this positive electrode, while describing the structure of a lithium secondary battery.

In one example of the lithium secondary battery of the present embodiment, the lithium secondary battery includes a positive electrode, a negative electrode, a separator interposed between the positive electrode and the negative electrode, and an electrolytic solution disposed between the positive electrode and the negative electrode.

Figure 1B:
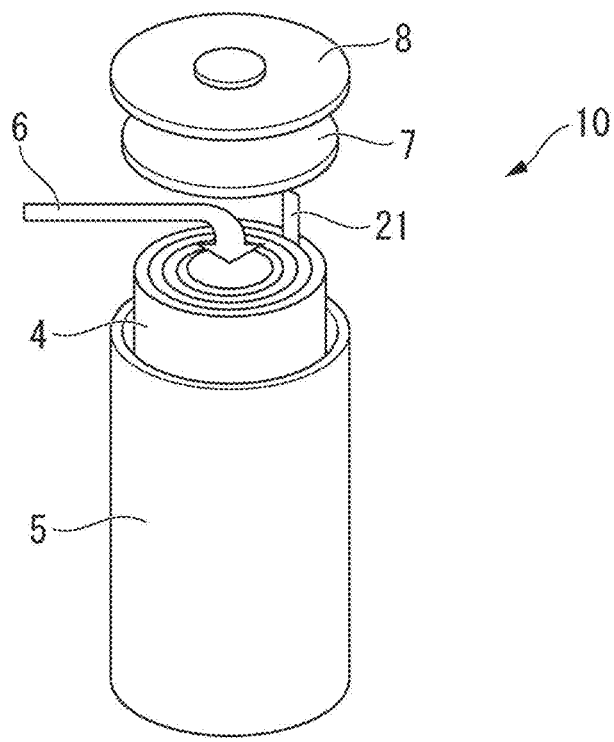
FIG. 1B is a schematic view showing one example of a lithium ion secondary battery.

Each of FIG. 1A and FIG. 1B is a schematic view illustrating an example of the lithium secondary battery of the present embodiment. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound into an electrode group 4.

Next, as illustrated in FIG. 1B, the electrode group 4 and an insulator (not shown) are placed in a battery can 5, followed by sealing the bottom of the can, and then an electrolytic solution 6 is impregnated into the electrode group 4 such that an electrolyte is disposed between the positive electrode 2 and the negative electrode 3. Further, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinbelow, the respective components will be described.

(Positive Electrode)

The positive electrode of the present embodiment can be manufactured by, first, preparing a positive electrode mix including the aforementioned positive electrode active material, a conductive material and a binder, and causing the positive electrode mix to be supported on a positive electrode current collector.

(Conductive Material)

As the conductive material included in the positive electrode active material of the present embodiment, a carbonaceous material can be used. Examples of the carbonaceous material include a graphite powder, a carbon black (such as acetylene black) and a fibrous carbonaceous material. Since carbon black is a microparticle and has a large surface area, the addition of only a small amount of the carbon black to the positive electrode mix increases the conductivity within the positive electrode, and improves the charge/discharge efficiency and the output performance as well; however, too large an amount of carbon black deteriorates the binding strength of the binder exerted not only between the positive electrode mix and the positive electrode current collector but also within the positive electrode mix, thereby becoming an adverse factor that increases an internal resistance.

The amount of the conductive material in the positive electrode mix is preferably 5 parts by mass or more and 20 parts by mass or less, relative to 100 parts by mass of the positive electrode active material. This amount may be decreased when using a fibrous carbonaceous material such as a graphitized carbon fiber or a carbon nanotube as the conductive material.

(Binder)

As the binder included in the positive electrode active material of the present embodiment, a thermoplastic resin can be used.

Examples of the thermoplastic resin include fluororesins such as polyvinylidene fluoride (hereinafter also referred to as PVdF), polytetrafluoroethylene (hereinafter also referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.

(Positive Electrode Current Collector)

As the positive electrode current collector included in the positive electrode active material of the present embodiment, it is possible to use a strip-shaped member composed of a metal material such as Al, Ni, or stainless steel as a component material. It is especially preferred to use a current collector which is made of Al and is shaped into a thin film because of its high processability and low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary battery of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and $SiO$; oxides of titanium represented by the formula: $TiO_x$ (wherein x is an positive integer) such as $TiO_2$ and $TiO$; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and $FeO$; oxides of tin represented by the formula: $SnO_x$ (wherein x is an positive integer) such as $SnO_2$ and $SnO$; oxides of tungsten represented by the formula: $WO_x$ (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and $TiS$; sulfides of vanadium represented by the formula: $VSx$ (wherein x is an positive integer) such as $V_3S_4$, $VS_2$, and $VS$; sulfides of iron represented by the formula: $FeSx$ (wherein x is an positive integer) such as $Fe_3S_4$, $FeS_2$ and $FeS$; sulfides of molybdenum represented by the formula: $MoSx$ (wherein x is an positive integer) such as $Mo_2S_3$ and $MoS_2$; sulfides of tin represented by the formula: $SnSx$ (wherein x is an positive integer) such as $SnS_2$ and $SnS$; sulfides of tungsten represented by the formula: $WSx$ (wherein x is an positive integer) such as $WS_2$; sulfides of antimony represented by the formula: $SbS_x$ (wherein x is an positive integer) such as $Sb_2S_3$; and sulfides of selenium represented by the formula: $SeSx$ (wherein x is an positive integer) such as $SeS_3$, $SeS_2$ and $SeS$.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode active materials, carbonaceous materials composed mainly of graphite such as natural graphite or artificial graphite are preferably used for reasons such as follows: the potential of the negative electrode hardly changes during charging from an uncharged state to a fully charged state (the potential flatness is favorable), the average discharge potential is low, the capacity retention after repeated charge/discharge cycles is high (the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

In the present embodiment, for satisfactory permeation of the electrolyte through the separator during the use (charge and discharge) of the battery, the separator preferably has an air resistance of 50 sec/100 cc or more and 300 sec/100 cc or less, more preferably 50 sec/100 cc or more and 200 sec/100 cc or less, as measured by the Gurley method prescribed in JIS P 8117: 2009.

The porosity of the separator is preferably 30% by volume or more and 80% by volume or less, and more preferably 40% by volume or more and 70% by volume or less. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(S_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein "FSI" means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of LiPF6, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and γ-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the safety of the obtained lithium secondary battery, it is preferable to use an electrolytic solution including a lithium compound containing fluorine such as $LiPF_6$ and an organic solvent having a fluorine substituent. A solvent mixture including ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. In some cases, the use of such a solid electrolyte may further improve the safety of the lithium secondary battery.

In the lithium secondary battery of the present embodiment, the solid electrolyte, when used, may serve as a separator. In such a case, the separator may be omitted.

The positive electrode active material having features as described above contains the lithium metal composite oxide of the present embodiment described above, whereby the positive electrode active material allows a lithium secondary battery using the positive electrode active material to enjoy a longer battery life.

The positive electrode having features as described above uses the positive electrode active material of the present embodiment as described above, whereby a lithium secondary battery using the positive electrode can enjoy a longer battery life.

Furthermore, the lithium secondary battery having features as described above has the aforementioned positive electrode, and hence has a longer battery life than the conventional lithium secondary batteries.

EXAMPLES

Hereinbelow, the present invention will be described in more detail with reference to the Examples.

In the present Examples, evaluations of the produced positive electrode active material for a lithium secondary battery, positive electrode for a lithium secondary battery and lithium secondary battery were implemented as follows.
(1) Evaluation of Positive Electrode Active Material for Lithium Secondary Battery
[Measurement of Average Particle Diameter]

The measurement of average particle diameter was performed using a laser diffraction particle size analyzer (LA-950, manufactured by Horiba, Ltd.) with respect to a dispersion obtained by charging 0.1 g of a powder of the positive electrode active material for a lithium secondary battery into 50 ml of a 0.2% by mass aqueous sodium hexametaphosphate solution so as to disperse the powder in the solution. The obtained dispersion is subjected to a particle size distribution measurement, whereby a volume-based cumulative particle size distribution curve is obtained. From the obtained cumulative particle size distribution curve, the particle diameter ($D_{50}$) at a 50% cumulation measured from the smaller particle side is determined as the average particle diameter of the positive electrode active material for a lithium secondary battery.

[Measurement of BET Specific Surface Area]

The BET specific surface area was measured using Macsorb (registered trademark) manufactured by Mountech Co., Ltd. after 1 g of the sample powder of the positive electrode active material for a lithium secondary battery was dried at 105° C. in a nitrogen atmosphere for 30 minutes.

[Observation of Cross Section of Positive Electrode Active Material for Lithium Secondary Battery]

A powder of a positive electrode active material for a lithium secondary battery was processed with a focused ion beam processing apparatus (FB2200, manufactured by Hitachi High-Technologies Corporation) to prepare a cross section of the positive electrode active material, and the cross section was observed as a scanning ion microscope image (SIM image) using a focused ion beam processing apparatus, or was observed as a scanning electron microscope image (SEM image) using a scanning electron microscope (S-4800, manufactured by Hitachi High-Technologies Corporation). Alternatively, a powder of the positive electrode active material was processed with an ion milling apparatus (IM4000, manufactured by Hitachi High-Technologies Corporation) to prepare a cross section of the positive electrode active material powder, and the cross section was observed as a SEM image using the scanning electron microscope. A cross section of the positive electrode active material was selected, which has a maximum diameter with a length of 50 to 200% of the volume-based 50% cumulative particle diameter $D_{50}$ (μm) obtained by the laser diffraction type particle size distribution measurement, and which has a minimum diameter/maximum diameter ratio of more than 0.5, and the selected cross section was photographed at the maximum magnification that allows the positive electrode active material particle to be shown within the frame.

[Method for Measuring Number of Void Cross Sections per 1 μm²]

The cross-sectional image was input into a computer, binarized with an intermediate value between the maximum luminance and the minimum luminance in the image of the secondary particle using an image analysis software Image J, and a binarized image was obtained while converting the color of inside of the cross section of the secondary particle into black and converting the color of cross sections of voids present inside the cross section of the secondary particle into white. With respect to the binarized image, a centroidal position and an area of the cross section of the secondary particle were calculated. Also, the number of the cross sections of the voids present within the cross section of the secondary particle, and the centroidal position, area and maximum diameter of each of the cross sections of the voids were also calculated. The calculation was carried out on the premise that the cross sections of the voids present within the cross section had an area of 0.01 μm² or more.

The number of the void cross section per 1 μm² was measured as follows.

> Number of void cross section per 1 μm² (number/m²)=number of void cross section present within cross section of secondary particle/cross-sectional area of secondary particle

[Method for Measuring Void Cross-sectional Area Ratio]

With the volume-based 50% cumulative particle diameter $D_{50}$ (μm) obtained by the laser diffraction type particle size distribution measurement being defined as A and the centroid of the secondary particle cross section calculated by image analysis being supposed as a center, a circle was drawn so as to have a radius of A/4. The inside of the circle was defined as the middle portion of the particle, and the outside of the circle was defined as the surface portion of the particle.

The void cross-sectional area ratio in the surface portion of the secondary particle (ratio of cross-sectional area of the void in the surface portion of the secondary particle to cross-sectional area of the surface portion of the secondary particle) was calculated as follows.

> Void cross-sectional area ratio (%) in the surface portion of the secondary particle=cross-sectional area of the void in the surface portion of the secondary particle/cross-sectional area of the surface portion of the secondary particle×100

The void cross-sectional area ratio in the middle portion of the secondary particle (ratio of cross-sectional area of the void in the middle portion of the secondary particle to cross-sectional area of the middle portion of the secondary particle) was calculated as follows.

> Void cross-sectional area ratio (%) in the middle portion of the secondary particle=cross-sectional area of the void in the middle portion of the secondary particle/cross-sectional area of the middle portion of the secondary particle×100

The ratio of the void cross-sectional area ratio in the middle portion of the secondary particle to the void cross-sectional area ratio in the surface portion of the secondary particle was calculated as follows.

> Ratio of the void cross-sectional area ratio in the middle portion of the secondary particle to the void cross-sectional area ratio in the surface portion of the secondary particle=void cross-sectional area ratio (%) in the middle portion of the secondary particle/void cross-sectional area ratio (%) in the surface portion of the secondary particle The void cross-sectional area ratio in the entire cross section of the secondary particle (area ratio of the void cross section in the cross section of the secondary particle to the cross section of the secondary particle) was calculated as follows.

> Void cross-sectional area ratio (%) in the entire cross section of the secondary particle=cross-sectional area of the void present in the cross section of the secondary particle/cross-sectional area of the secondary particle×100

[Method for Measuring NMP Liquid Retention]

The NMP liquid retention was calculated by equation (1) below:

$$\text{NMP liquid retention (\%)}=[C/B]\times 100 \quad (1),$$

wherein B is a NMP absorption amount when the positive electrode active material in a dried form is impregnated with NMP, and C is a NMP content when the positive electrode active material impregnated with NMP is dried at 60° C. for 30 minutes.

Specifically, 1 g of the positive electrode active material in a dried form was impregnated with NMP, and the above weight of 1 g was subtracted from the weight of the positive electrode active material impregnated with NMP to obtain the value of B. Further, the above weight of 1 g was subtracted from the weight of the positive electrode active material impregnated with NMP which had been dried at 60° C. for 30 minutes to obtain the value of C.

[Composition Analysis]

The composition analysis of the lithium metal composite oxide powder manufactured by the method described below was carried out using an inductively coupled plasma emission spectrometer (SPS3000, manufactured by SII Nano Technology Inc.) after the lithium metal composite oxide powder was dissolved in hydrochloric acid.

(2) Production of Positive Electrode for Lithium Secondary Battery

A positive electrode active material obtained by the production method described below, a conductive material (acetylene black), and a binder (PVdF) were mixed and kneaded so as to obtain a composition wherein positive electrode active material:conductive material:binder=92:5:3 (mass ratio), thereby preparing a paste-like positive electrode mix. In preparation of the positive electrode mix, N-methyl-2-pyrrolidone was used as an organic solvent.

The obtained positive electrode mix was applied to a 40 µm-thick Al foil which served as a current collector, and was dried in vacuo at 150° C. for eight hours, thereby obtaining a positive electrode for a lithium secondary battery. The electrode area of the positive electrode for a lithium secondary battery was set to 1.65 cm$^2$.

(3) Production of Negative Electrode for Lithium Secondary Battery

Next, artificial graphite (MAGD, manufactured by Hitachi Chemical Co., Ltd.) as a negative electrode active material, CMC (manufactured by Daiichi Kogyo Co., Ltd.) and SBR (manufactured by Nippon A & L Inc.) as binders were mixed such that negative electrode active material: CMC:SBR=98:1:1 (mass ratio), and the resulting was kneaded to prepare a paste-like negative electrode mix. In preparation of the negative electrode mix, an ion exchanged water was used as a solvent.

The obtained negative electrode mix was applied to a 12 µm-thick Cu foil which served as a current collector, and was dried in a vacuum at 60° C. for eight hours, thereby obtaining a negative electrode for a lithium secondary battery. The electrode area of the negative electrode for a lithium secondary battery was set to 1.77 cm$^2$.

(4) Production of Lithium Secondary Battery (Coin-type Full Cell)

The following operations were carried out in an argon atmosphere within a glove box.

The positive electrode produced in the "(2) Production of Positive Electrode for Lithium Secondary Battery" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 µm)) was placed on the positive electrode. 300 µl of an electrolytic solution was injected thereinto. The electrolytic solution used was prepared by adding 1% by volume of vinylene carbonate (hereinafter, sometimes referred to as VC) to a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 16:10:74, followed by dissolving 1.3 mol/l of LiPF$_6$ in the mixture. Hereinafter, the electrolytic solution may also be referred to as "LiPF$_6$/EC+ DMC+EMC".

Next, the negative electrode produced in the above "(3) Production of Negative Electrode for Lithium Secondary Battery" was placed on the laminate film separator, covered with a top lid through a gasket, and swaged using a swage, thereby producing a lithium secondary battery (coin-type full cell R2032). Hereinafter, this battery may also be referred to as "full cell".

(5) Initial Charge/Discharge Test

An initial charge/discharge test was carried out under conditions described below using the full cell produced in the above "(4) Production of Lithium Secondary Battery (Coin-type Full Cell)".

<Cycle Test>

Using the full cell manufactured above, a cycle test of 200 cycles was carried out to evaluate the battery life and the discharge capacity retention after 200 cycles was calculated by the formula described below. The higher discharge capacity retention after 200 cycles means longer battery life.

Discharge capacity retention after 200 cycles (%)=discharge capacity at the 200th cycle/discharge capacity at the 1st cycle×100

<Conditions for Cycle Test>

Test temperature: 60° C.

Charge conditions: Maximum charge voltage 4.1 V, charge time 0.5 hours, and charge current 2.0 CA Time of pause after charge: 10 minutes Discharge conditions: Minimum discharge voltage 3.0 V, discharge time 0.5 hours, and discharge current 2.0 CA Time of pause after discharge: 10 minutes In this test, one cycle is a set of charge, pause of charge, discharge and pause of discharge which were performed in this order.

Example 1

1. Production of Positive Electrode Active Material 1 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.315:0.33:0.355, to thereby prepare a raw material mixture solution.

Then, the obtained raw material mixture solution and an aqueous ammonium sulfate solution as a complexing agent were continuously added to the reaction vessel with stirring, and an oxygen-containing gas obtained by mixing air into nitrogen gas so that the oxygen concentration became 4.9% was continuously passed through the reaction vessel. An aqueous solution of sodium hydroxide was dropwise added to the reaction vessel at an appropriate timing such that the pH of the solution in the reaction vessel became 11.9, thereby obtaining nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 1. The BET specific surface area of the nickel-cobalt-manganese composite hydroxide 1 was 21.0 m$^2$/g.

The thus obtained nickel-cobalt-manganese composite hydroxide 1 and a lithium carbonate powder were weighed such that Li/(Ni+Co+Mn)=1.13, followed by mixing. The resulting was calcined in ambient atmosphere at 925° C. for 6 hours, thereby obtaining an intended positive electrode active material 1 for a lithium secondary battery.

2. Evaluation of Positive Electrode Active Material 1 for Lithium Secondary Battery The composition analysis of the obtained positive electrode active material 1 for a lithium secondary battery was performed and the results were applied to the composition formula (I). As a result, it was found that x=0.06, a=0.315, b=0.330, c=0.355, and d=0.

The volume-based 50% cumulative particle size $D_{50}$ of the positive electrode active material 1 for a lithium secondary battery was 6.1 m.

The BET specific surface area of the positive electrode active material 1 for a lithium secondary battery was 1.7 $m^2/g$.

In the positive electrode active material 1 for a lithium secondary battery, the number of void cross section per 1 $\mu m^2$ of the cross section of the secondary particle was 0.60.

A centroid of the void cross section was present in the surface portion of the secondary particle present in the positive electrode active material 1 for a lithium secondary battery, and a void cross-sectional area ratio in the surface portion, i.e., area ratio of the void cross section to the cross section of the surface portion of the secondary particle, was 16.9%. Further, a centroid of the void cross section was also present in the middle portion of the secondary particle, a void cross-sectional area ratio in the middle portion, i.e., area ratio of the void cross section in the middle portion of the secondary particle to the cross section of the middle portion of the secondary particle, was 61.2%, and the ratio of the void cross-sectional area ratio in the middle portion to the void cross-sectional area ratio in the surface portion (void cross-sectional area ratio in the middle portion/void cross-sectional area ratio in the surface portion) was 3.6.

With respect to the positive electrode active material 1 for a lithium secondary battery, the void cross-sectional area ratio in the entire cross section of the secondary particle (area ratio of the void cross section in the cross section of the secondary particle to the cross section of the secondary particle) was 25.8%.

The NMP liquid retention of the positive electrode active material 1 for a lithium secondary battery was 43.6%.

The capacity retention of the positive electrode active material 1 for a lithium secondary battery was as high as 79.4%.

Example 2

1. Production of Positive Electrode Active Material 2 for Lithium Secondary Battery Into a reaction vessel equipped with a stirrer and an overflow pipe was charged water, followed by addition of an aqueous sodium hydroxide solution. The temperature of the resulting liquid was maintained at 30° C.

An aqueous nickel sulfate solution, an aqueous cobalt sulfate solution and an aqueous manganese sulfate solution were mixed together such that the atomic ratio between nickel atoms, cobalt atoms and manganese atoms became 0.34:0.33:0.33, to thereby prepare a raw material mixture solution.

Then, the obtained raw material mixture solution and an aqueous ammonium sulfate solution as a complexing agent were continuously added to the reaction vessel with stirring, and an oxygen-containing gas obtained by mixing air into nitrogen gas so that the oxygen concentration became 4.2% was continuously passed through the reaction vessel. An aqueous solution of sodium hydroxide was dropwise added to the reaction vessel at an appropriate timing such that the pH of the solution in the reaction vessel became 12.5, thereby obtaining nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 2. The BET specific surface area of the nickel-cobalt-manganese composite hydroxide 2 was 34.4 $m^2/g$.

The thus obtained nickel-cobalt-manganese composite hydroxide 2 and a lithium carbonate powder were weighed such that Li/(Ni+Co+Mn)=1.13, followed by mixing. The resulting was calcined in ambient atmosphere at 925° C. for 8 hours, thereby obtaining an intended positive electrode active material 2 for a lithium secondary battery.

2. Evaluation of Positive Electrode Active Material 2 for Lithium Secondary Battery The composition analysis of the obtained positive electrode active material 2 for a lithium secondary battery was performed and the results were applied to the composition formula (I). As a result, it was found that x=0.05, a=0.34, b=0.33, c=0.33, and d=0.

The volume-based 50% cumulative particle size $D_{50}$ of the positive electrode active material 2 for a lithium secondary battery was 3.9 m.

The BET specific surface area of the positive electrode active material 2 for a lithium secondary battery was 1.6 $m^2/g$.

In the positive electrode active material 2 for a lithium secondary battery, the number of void cross sections per 1 $\mu m^2$ of the cross section of the secondary particle was 4.35.

A centroid of the void cross section was present on the surface portion of the secondary particle present in the positive electrode active material 2 for a lithium secondary battery, and a void cross-sectional area ratio in the surface portion, i.e., area ratio of the void cross section to the cross section of the surface portion of the secondary particle, was 0.9%. Further, a centroid of the void cross section was also present in the middle portion of the secondary particle, a void cross-sectional area ratio in the middle portion, i.e., area ratio of the void cross section in the middle portion of the secondary particle to the cross section of the middle portion of the secondary particle, was 21.2%, and the ratio of the void cross-sectional area ratio in the middle portion to the void cross-sectional area ratio in the surface portion (void cross-sectional area ratio in the middle portion/void cross-sectional area ratio in the surface portion) was 25.0.

With respect to the positive electrode active material 2 for a lithium secondary battery, the void cross-sectional area ratio in the entire cross section of the secondary particle (area ratio of the void cross section in the cross section of the secondary particle to the cross section of the secondary particle) was 13.1%.

The NMP liquid retention of the positive electrode active material 2 for a lithium secondary battery was 25.4%.

The capacity retention of the positive electrode active material 2 for a lithium secondary battery was as high as 77.5%.

Example 3

1. Production of Positive Electrode Active Material 3 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.55:0.21:0.24, to thereby prepare a raw material mixture solution.

Then, the obtained raw material mixture solution and an aqueous ammonium sulfate solution as a complexing agent were continuously added to the reaction vessel with stirring, and an oxygen-containing gas obtained by mixing air into nitrogen gas so that the oxygen concentration became 12.3% was continuously passed through the reaction vessel. An aqueous solution of sodium hydroxide was dropwise added to the reaction vessel at an appropriate timing such that the pH of the solution in the reaction vessel became 12.7, thereby obtaining nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 3. The BET specific surface area of the nickel-cobalt-manganese composite hydroxide 3 was 58.9 m²/g.

The thus obtained nickel-cobalt-manganese composite hydroxide 3 and a lithium carbonate powder were weighed such that Li/(Ni+Co+Mn)=1.08, followed by mixing. The resulting was calcined in ambient atmosphere at 760° C. for 5 hours, followed by further calcination in ambient atmosphere at 850° C. for 10 hours, thereby obtaining an intended positive electrode active material 3 for a lithium secondary battery.

2. Evaluation of Positive Electrode Active Material 3 for Lithium Secondary Battery The composition analysis of the obtained positive electrode active material 3 for a lithium secondary battery was performed and the results were applied to the composition formula (I). As a result, it was found that x=0.04, a=0.55, b=0.21, c=0.24Z, and d=0.

The volume-based 50% cumulative particle size $D_{50}$ of the positive electrode active material 3 for a lithium secondary battery was 6.0 m.

The BET specific surface area of the positive electrode active material 3 for a lithium secondary battery was 1.6 μm²/g.

In the positive electrode active material 3 for a lithium secondary battery, the number of void cross sections per 1 μm² of the cross section of the secondary particle was 2.26.

A centroid of the void cross section was present in the surface portion of the secondary particle present in the positive electrode active material 3 for a lithium secondary battery, and a void cross-sectional area ratio in the surface portion, i.e., area ratio of the void cross section to the cross section of the surface portion of the secondary particle, was 10.9%. Further, a centroid of the void cross section was also present in the middle portion of the secondary particle, a void cross-sectional area ratio in the middle portion, i.e., area ratio of the void cross section in the middle portion of the secondary particle to the cross section of the middle portion of the secondary particle, was 17.7%, and the ratio of the void cross-sectional area ratio in the middle portion to the void cross-sectional area ratio in the surface portion (void cross-sectional area ratio in the middle portion/void cross-sectional area ratio in the surface portion) was 1.6.

With respect to the positive electrode active material 3 for a lithium secondary battery, the void cross-sectional area ratio in the entire cross section of the secondary particle (area ratio of the void cross section in the cross section of the secondary particle to the cross section of the secondary particle) was 14.3%.

The NMP liquid retention of the positive electrode active material 3 for a lithium secondary battery was 59.0%.

The capacity retention of the positive electrode active material 3 for a lithium secondary battery was as high as 82.5%.

Example 4

1. Production of Positive Electrode Active Material 4 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.55:0.21:0.24, to thereby prepare a raw material mixture solution.

Then, the obtained raw material mixture solution and an aqueous ammonium sulfate solution as a complexing agent were continuously added to the reaction vessel with stirring, and an oxygen-containing gas obtained by mixing air into nitrogen gas so that the oxygen concentration became 7.0% was continuously passed through the reaction vessel. An aqueous solution of sodium hydroxide was dropwise added to the reaction vessel at an appropriate timing such that the pH of the solution in the reaction vessel became 12.1, thereby obtaining nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 4. The BET specific surface area of the nickel-cobalt-manganese composite hydroxide 4 was 82.5 m²/g.

The thus obtained nickel-cobalt-manganese composite hydroxide 4 and a lithium carbonate powder were weighed such that Li/(Ni+Co+Mn)=1.08, followed by mixing. The resulting was calcined in ambient atmosphere at 760° C. for 5 hours, followed by further calcination in ambient atmosphere at 850° C. for 10 hours, thereby obtaining an intended positive electrode active material 4 for a lithium secondary battery.

2. Evaluation of Positive Electrode Active Material 4 for Lithium Secondary Battery The composition analysis of the obtained positive electrode active material 4 for a lithium secondary battery was performed and the results were applied to the composition formula (I). As a result, it was found that x=0.04, a=0.55, b=0.21, c=0.24, and d=0.

The volume-based 50% cumulative particle diameter $D_{50}$ of the positive electrode active material 4 for a lithium secondary battery was 4.0 m.

The BET specific surface area of the positive electrode active material 4 for a lithium secondary battery was 2.0 m²/g.

In the positive electrode active material 4 for a lithium secondary battery, the number of void cross sections per 1 μm² of the cross section of the secondary particle was 2.59.

A centroid of the void cross section was present in the surface portion of the secondary particle present in the positive electrode active material 4 for a lithium secondary battery, and a void cross-sectional area ratio in the surface portion, i.e., area ratio of the void cross section to the cross section of the surface portion of the secondary particle, was 10.4%. Further, a centroid of the void cross section was also present in the middle portion of the secondary particle, a void cross-sectional area ratio in the middle portion, i.e., area ratio of the void cross section in the middle portion of the secondary particle to the cross section of the middle portion of the secondary particle, was 55.6%, and the ratio of the void cross-sectional area ratio in the middle portion to the void cross-sectional area ratio in the surface portion (void cross-sectional area ratio in the middle portion/void cross-sectional area ratio in the surface portion) was 5.4.

With respect to the positive electrode active material 4 for a lithium secondary battery, the void cross-sectional area ratio in the entire cross section of the secondary particle (area ratio of the void cross section in the cross section of the secondary particle to the cross section of the secondary particle) was 20.6%.

The NMP liquid retention of the positive electrode active material 4 for a lithium secondary battery was 56.0%.

The capacity retention of the positive electrode active material 4 for a lithium secondary battery was as high as 78.7%.

Example 5

1. Production of Positive Electrode Active Material 5 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.510:0.225:0.265, to thereby prepare a raw material mixture solution.

Then, the obtained raw material mixture solution and an aqueous ammonium sulfate solution as a complexing agent were continuously added to the reaction vessel with stirring, and an oxygen-containing gas obtained by mixing air into nitrogen gas so that the oxygen concentration became 8.8% was continuously passed through the reaction vessel. An aqueous solution of sodium hydroxide was dropwise added to the reaction vessel at an appropriate timing such that the pH of the solution in the reaction vessel became 11.8, thereby obtaining nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 5. The BET specific surface area of the nickel-cobalt-manganese composite hydroxide 5 was 42.8 m$^2$/g.

The thus obtained nickel-cobalt-manganese composite hydroxide 5 and a lithium carbonate powder were weighed such that Li/(Ni+Co+Mn)=1.08, followed by mixing. The resulting was calcined in ambient atmosphere at 690° C. for 3 hours, followed by further calcination in ambient atmosphere at 850° C. for 10 hours, thereby obtaining an intended positive electrode active material 5 for a lithium secondary battery.

2. Evaluation of Positive Electrode Active Material 5 for Lithium Secondary Battery The composition analysis of the obtained positive electrode active material 5 for a lithium secondary battery was performed and the results were applied to the composition formula (I). As a result, it was found that x=0.03, a=0.510, b=0.225, c=0.265, and d=0.

The volume-based 50% cumulative particle diameter $D_{50}$ of the positive electrode active material 5 for a lithium secondary battery was 5.0 m.

The BET specific surface area of the positive electrode active material 5 for a lithium secondary battery was 1.9 m$^2$/g.

In the positive electrode active material 5 for a lithium secondary battery, the number of void cross sections per 1 μm$^2$ of the cross section of the secondary particle was 1.33.

A centroid of the void cross section was present on the surface portion of the secondary particle present in the positive electrode active material 5 for a lithium secondary battery, and a void cross-sectional area ratio in the surface portion, i.e., area ratio of the void cross section in the surface portion of the secondary particle to the cross section of the surface portion of the secondary particle, was 7.5%. Further, a centroid of the void cross section was also present in the middle portion of the secondary particle, a void cross-sectional area ratio in the middle portion, i.e., area ratio of the void cross section in the middle portion of the secondary particle to the cross section of the middle portion of the secondary particle, was 38.7%, and the ratio of the void cross-sectional area ratio in the middle portion to the void cross-sectional area ratio in the surface portion (void cross-sectional area ratio in the middle portion/void cross-sectional area ratio in the surface portion) was 5.2.

With respect to the positive electrode active material 5 for a lithium secondary battery, the void cross-sectional area ratio in the entire cross section of the secondary particle (area ratio of the void cross section in the cross section of the secondary particle to the cross section of the secondary particle) was 11.2%.

The NMP liquid retention of the positive electrode active material 5 for a lithium secondary battery was 38.1%.

The capacity retention of the positive electrode active material 5 for a lithium secondary battery was as high as 80.8%.

Comparative Example 1

1. Production of Positive Electrode Active Material 6 for Lithium Secondary Battery Into a reaction vessel equipped with a stirrer and an overflow pipe was charged water, followed by addition of an aqueous sodium hydroxide solution. The temperature of the resulting liquid was maintained at 30° C.

An aqueous nickel sulfate solution, an aqueous cobalt sulfate solution and an aqueous manganese sulfate solution were mixed together such that the atomic ratio between nickel atoms, cobalt atoms and manganese atoms became 0.34:0.33:0.33, to thereby prepare a raw material mixture solution.

Then, the obtained raw material mixture solution and an aqueous ammonium sulfate solution as a complexing agent were continuously added to the reaction vessel with stirring, and an oxygen-containing gas obtained by mixing air into nitrogen gas so that the oxygen concentration became 2.7% was continuously passed through the reaction vessel. An aqueous solution of sodium hydroxide was dropwise added to the reaction vessel at an appropriate timing such that the pH of the solution in the reaction vessel became 11.7, thereby obtaining nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 6. The BET specific surface area of the nickel-cobalt-manganese composite hydroxide 6 was 13.9 μm$^2$/g.

The thus obtained nickel-cobalt-manganese composite hydroxide 6 and a lithium carbonate powder were weighed such that Li/(Ni+Co+Mn)=1.08, followed by mixing. The resulting was calcined in ambient atmosphere at 925° C. for 8 hours, thereby obtaining an intended positive electrode active material 6 for a lithium secondary battery.

2. Evaluation of Positive Electrode Active Material 6 for Lithium Secondary Battery The composition analysis of the obtained positive electrode active material 6 for a lithium secondary battery was performed and the results were applied to the composition formula (I). As a result, it was found that x=0.04, a=0.34, b=0.33, c=0.33, and d=0.

The volume-based 50% cumulative particle size $D_{50}$ of the positive electrode active material 6 for a lithium secondary battery was 4.5 m.

The BET specific surface area of the positive electrode active material 6 for a lithium secondary battery was 1.1 $\mu m^2/g$.

In the positive electrode active material 6 for a lithium secondary battery, the number of void cross sections per 1 $\mu m^2$ of the cross section of the secondary particle was 0.29.

A centroid of the void cross section was present on the surface portion of the secondary particle present in the positive electrode active material 6 for a lithium secondary battery, and a void cross-sectional area ratio in the surface portion, i.e., area ratio of the void cross section to the cross section of the surface portion of the secondary particle, was 0.7%. Further, a centroid of the void cross section was also present in the middle portion of the secondary particle, a void cross-sectional area ratio in the middle portion, i.e., area ratio of the void cross section in the middle portion of the secondary particle to the cross section of the middle portion of the secondary particle, was 20.2%, and the ratio of the void cross-sectional area ratio in the middle portion to the void cross-sectional area ratio in the surface portion (void cross-sectional area ratio in the middle portion/void cross-sectional area ratio in the surface portion) was 28.1.

With respect to the positive electrode active material 6 for a lithium secondary battery, the void cross-sectional area ratio in the entire cross section of the secondary particle (area ratio of the void cross section in the cross section of the secondary particle to the cross section of the secondary particle) was 9.6%.

The NMP liquid retention of the positive electrode active material 6 for a lithium secondary battery was 16.8%.

The capacity retention of the positive electrode active material 6 for a lithium secondary battery was as high as 74.1%.

Comparative Example 2

1. Production of Positive Electrode Active Material 7 for Lithium Secondary Battery Into a reaction vessel equipped with a stirrer and an overflow pipe was charged water, followed by addition of an aqueous sodium hydroxide solution. The temperature of the resulting liquid was maintained at 30° C.

An aqueous nickel sulfate solution, an aqueous cobalt sulfate solution and an aqueous manganese sulfate solution were mixed together such that the atomic ratio between nickel atoms, cobalt atoms and manganese atoms became 0.60:0.20:0.20, to thereby prepare a raw material mixture solution.

Then, the obtained raw material mixture solution and an aqueous ammonium sulfate solution as a complexing agent were continuously added to the reaction vessel with stirring, and nitrogen gas was continuously passed through the reaction vessel. An aqueous solution of sodium hydroxide was dropwise added to the reaction vessel at an appropriate timing such that the pH of the solution in the reaction vessel became 12.8, thereby obtaining nickel-cobalt-manganese composite hydroxide particles. The obtained particles were washed with an aqueous solution of sodium hydroxide, dehydrated by a centrifugal separator, separated and dried at 105° C. to obtain a nickel-cobalt-manganese composite hydroxide 7. The BET specific surface area of the nickel-cobalt-manganese composite hydroxide 7 was 10.3 $\mu m^2/g$.

The thus obtained nickel-cobalt-manganese composite hydroxide 7 and a lithium carbonate powder were weighed such that Li/(Ni+Co+Mn)=1.04, followed by mixing. The resulting was calcined in ambient atmosphere at 760° C. for 5 hours, followed by further calcination in ambient atmosphere at 850° C. for 10 hours, thereby obtaining a positive electrode active material 7 for a lithium secondary battery.

2. Evaluation of Positive Electrode Active Material 7 for Lithium Secondary Battery The composition analysis of the obtained positive electrode active material 7 for a lithium secondary battery was performed and the results were applied to the composition formula (I). As a result, it was found that x=0.02, a=0.60, b=0.20, c=0.20, and d=0.

The volume-based 50% cumulative particle size $D_{50}$ of the positive electrode active material 7 for a lithium secondary battery was 6.0 m.

The BET specific surface area of the positive electrode active material 7 for a lithium secondary battery was 0.7 $m^2/g$.

In the positive electrode active material 7 for a lithium secondary battery, the number of void cross sections per 1 $\mu m^2$ of the cross section of the secondary particle was 0. Since the number of void cross section was 0, the void cross-sectional area ratio was not able to be evaluated.

The NMP liquid retention of the positive electrode active material 7 for a lithium secondary battery was 16.4%.

The capacity retention of the positive electrode active material 7 for a lithium secondary battery was as high as 47.7%.

Table 1 below collectively shows data on the positive electrode active materials (for a lithium secondary battery) obtained in Examples 1 to 5, and Comparative Examples 1 and 2, i.e., $D_{50}$, the BET specific surface area, the number of void cross sections per 1 $\mu m^2$, the void cross-sectional area ratio in the surface portion of the secondary particle, the void cross-sectional area ratio in the middle portion of the secondary particle, the ratio of void cross-sectional area ratio in the middle portion/void cross-sectional area ratio in the surface portion, the void cross-sectional area ratio in the entire cross section of the secondary particle, the NMP liquid retention, and the capacity retention.

Figure 4:
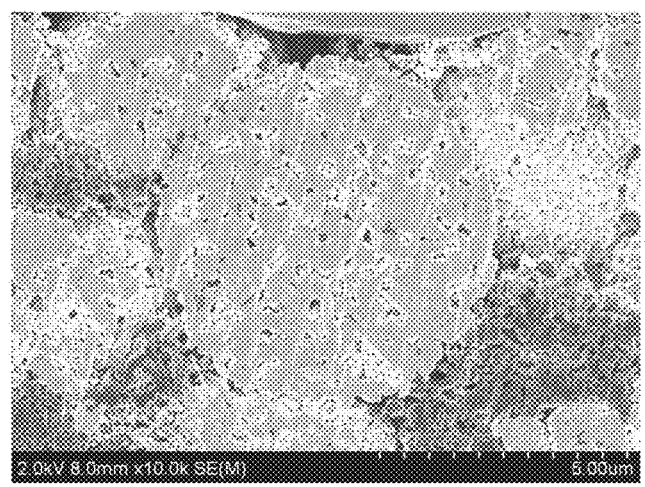
FIG. 4 is an SEM image of a cross section of a secondary particle in Example 3.
Figure 5:
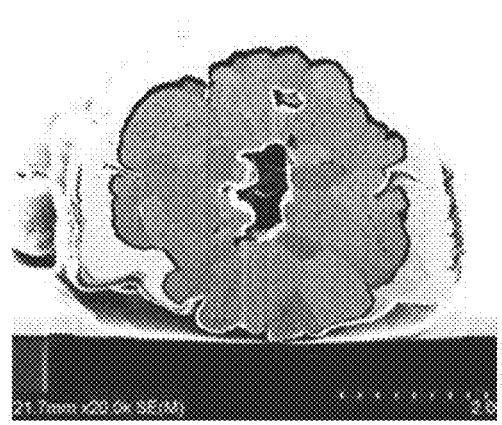
FIG. 5 is an SEM image of a cross section of a secondary particle in Comparative Example 1.
Figure 6:
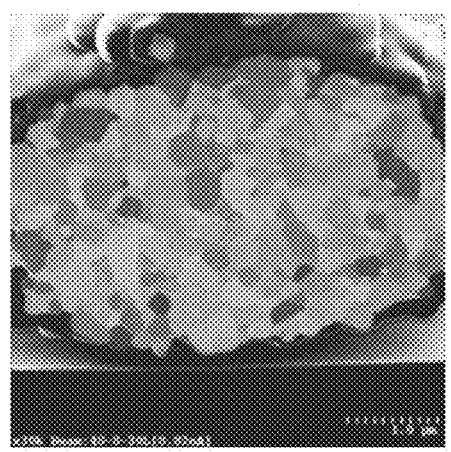
FIG. 6 is an image (hereinafter also referred to as SIM image) obtained by observing a cross section of a secondary particle in Comparative Example 2 with a scanning ion microscope (hereinafter also referred to as SIM).

FIG. 4 shows an SEM image of the cross section of the secondary particle in Example 3, FIG. 5 shows an SEM image of the cross section of the secondary particle in Comparative Example 1, and FIG. 6 shows an SIM image of the cross section of the secondary particle in Comparative Example 2.

TABLE 1

| | $D_{50}$ (μm) | BET specific surface area (m²/g) | Number of void cross sections per 1 μm² (Number) | Void cross-sectional area ratio in surface portion of secondary particle (%) | Void cross-sectional area ratio in middle portion of secondary particle (%) | Ratio of void cross-sectional area ratio in middle portion/void cross-sectional area ratio in surface portion | Void cross-sectional area ratio in entire cross section of secondary particle (%) | NMP retention (%) | Capacity retention (%) |
|---|---|---|---|---|---|---|---|---|---|
| Example 1 | 6.1 | 1.7 | 0.60 | 16.9 | 61.2 | 3.6 | 25.8 | 43.6 | 79.4 |
| Example 2 | 3.9 | 1.6 | 4.35 | 0.9 | 21.2 | 25.0 | 13.1 | 25.4 | 77.5 |
| Example 3 | 6.0 | 1.6 | 2.26 | 10.9 | 17.7 | 1.6 | 14.3 | 59.0 | 82.5 |
| Example 4 | 4.0 | 2.0 | 2.59 | 10.4 | 55.6 | 5.4 | 20.6 | 56.0 | 78.7 |
| Example 5 | 5.0 | 1.9 | 1.33 | 7.5 | 38.7 | 5.2 | 11.2 | 38.1 | 80.8 |
| Comparative Example 1 | 4.5 | 1.1 | 0.29 | 0.7 | 20.2 | 28.1 | 9.6 | 16.8 | 74.1 |
| Comparative Example 2 | 6.0 | 0.7 | 0 | — | — | — | — | 16.4 | 47.7 |

As shown in the above results, all of the positive electrode active materials (for a lithium secondary battery) of Examples 1 to 5 to which the present invention was applied had high capacity retention of at least 77%. Further, as shown in the SEM image of FIG. 4, the positive electrode active material for a lithium secondary battery to which the present invention was applied was in a state in which the cross section of the voids was dispersed in the cross section of the secondary particle. In each of Examples 1 to 5 to which the present invention was applied, the NMP liquid retention was as high as 25% or more. This also confirms that the application of the present invention produces communicating voids in the surface portion and the middle portion of the secondary particle.

In contrast, in each of Comparative Examples 1 and 2, to which the present invention was not applied, the capacity retention ratio was below 75%. In addition, as shown in the SEM image of FIG. 5, the void cross section was not dispersed, and the particle was a hollow particle. Furthermore, as shown in the SIM image of FIG. 6, there was almost no void cross section and the particle was a dense particle. In addition, each of the positive electrode active materials (for a lithium secondary battery) of Comparative Examples 1 and 2 had a NMP liquid retention significantly below 20%.

INDUSTRIAL APPLICABILITY

The present invention can provide a positive electrode active material for a lithium secondary battery exhibiting excellent capacity retention in high temperature cycles, a positive electrode for a lithium secondary battery using the positive electrode active material for a lithium secondary battery, and a lithium secondary battery having the positive electrode for a lithium secondary battery. Therefore, the present invention has industrial applicability.

DESCRIPTION OF THE REFERENCE SIGNS

1 Separator
2 Positive electrode
3 Negative electrode
4 Electrode group
Battery can
6 Electrolytic liquid
7 Top insulator
8 Sealing body
Lithium secondary battery
21 Positive electrode lead
31 Negative electrode lead
Cross section of secondary particle
41 Centroidal position of cross section of secondary particle
42 Centroidal position of cross section of void
43 Cross section of void
44 Radius (4/A) of circle
Cross section of secondary particle
46 Cross section of void
47 Cross section of void
50 Circle with radius 4/A

The invention claimed is:

1. A positive electrode active material for a lithium secondary battery, comprising a lithium composite metal oxide in a form of secondary particles that are aggregates of primary particles,
   wherein the secondary particles have voids in interior thereof, and
   wherein a number of the voids per 1 μm² of cross section of the secondary particles is 0.5 or more and 4.35 or less,
   wherein a crystal structure of the positive electrode active material of the lithium secondary battery is a hexagonal crystal structure, and
   wherein the positive electrode active material for a lithium secondary battery is represented by composition formula (I) below:

$$Li[Li_x(Ni_aCo_bMn_cM_d)_{1-x}]O_2 \quad (I),$$

wherein $-0.1 \leq x \leq 0.2$, $0 < a \leq 1$, $0 \leq b \leq 0.4$, $0 \leq c \leq 0.4$, $0 \leq d \leq 0.1$, $a+b+c+d=1$, and M represents at least one element selected from the group consisting of Fe, Cr, Cu, Ti, B, Mg, Al, W, Mo, Nb, Zn, Sn, Zr, Ga and V.

2. The positive electrode active material according to claim 1, which has at least one centroid of cross section of the void at each of a middle portion and a surface portion in the cross section of the secondary particles, and
   wherein a void cross-sectional area ratio in the surface portion which is a ratio of cross-sectional area of the void in the surface portion to cross-sectional area of the surface portion of the secondary particle is 0.75% or more and 50% or less, wherein the surface portion is an area excluding the middle portion which is a circle having a radius of A/4 wherein A is an average particle diameter, $D_{50}$, of the positive electrode active material as a whole measured by laser diffraction type particle size distribution measurement, and a center of the circle is the centroid of cross section of the secondary particle calculated by image processing.

3. The positive electrode active material according to claim 2, wherein a void cross-sectional area ratio in the middle portion which is a ratio of cross-sectional area of the void in the middle portion to the cross-sectional area of the middle portion of the secondary particle is 0.1% or more and 65% or less.

4. The positive electrode active material according to claim 2, wherein a ratio of the void cross-sectional area ratio in the middle portion of the secondary particle to the void cross-sectional area ratio in the surface portion of the secondary particle is 0.1 or more and 25 or less.

5. The positive electrode active material according to claim 1, wherein a void cross-sectional area ratio in entire particle cross section-which is a ratio of cross-sectional area of the void present in the cross section of the secondary particle to the cross-sectional area of the secondary particle is 1% or more and 50% or less.

6. The positive electrode according to claim 1, which has a N-methylpyrrolidone liquid retention ratio of 18% or more, wherein the N-methylpyrrolidone liquid retention ratio is determined by equation (1) below:

N-methylpyrrolidone liquid retention (%)=[C/B]×100     (1), wherein B is a N-methylpyrrolidone absorption amount when the positive electrode active material in a dried form is impregnated with N-methylpyrrolidone, and C is a N-methylpyrrolidone content when the positive electrode active material impregnated with N-methylpyrrolidone is dried at 60° C. for 30 minutes.

7. The positive electrode active material according to claim 1, wherein the composition formula (I) is composition formula (I)-1 below:

Li[Li$_x$(Ni$_a$Co$_b$Mn$_c$M$_d$)$_{1-x}$]O$_2$     (I)-1, wherein −0.1≤x≤0.2, 0<a≤0.7, 0≤b≤0.4, 0≤c≤0.4, 0≤d≤0.1, a+b+c+d=1, and M represents at least one element selected from the group consisting of Fe, Cr, Cu, Ti, B, Mg, Al, W, Mo, Nb, Zn, Sn, Zr, Ga and V.

8. A positive electrode for a lithium secondary battery, comprising the positive electrode active material of claim 1.

9. A lithium secondary battery, comprising the positive electrode of claim 8.

10. The positive electrode active material according to claim 1,
wherein a ratio of a void cross-sectional area ratio in a middle portion of the secondary particle to a void cross-sectional area ratio in a surface portion of the secondary particle is 1.6 or more and 25.0 or less,
wherein the void cross-sectional area ratio in the surface portion is a ratio of cross-sectional area of the void in the surface portion to cross-sectional area of the surface portion of the secondary particle,
wherein the surface portion is an area excluding the middle portion which is a circle having a radius of A/4 wherein A is an average particle diameter, $D_{50}$, of the positive electrode active material as a whole measured by laser diffraction type particle size distribution measurement, and a center of the circle is the centroid of cross section of the secondary particle calculated by image processing,
wherein the void cross-sectional area ratio in the middle portion is a ratio of cross-sectional area of the void in the middle portion to the cross-sectional area of the middle portion of the secondary particle.

11. A positive electrode active material for a lithium secondary battery, comprising a lithium composite metal oxide in a form of secondary particles that are aggregates of primary particles,
wherein the secondary particles have voids in interior thereof, and
wherein a number of the voids per 1 μm$^2$ of cross section of the secondary particles is 0.5 or more and 15 or less,
wherein a BET specific surface area of the positive electrode active material is 1.0 m$^2$/g or more and 3.0 m$^2$/g or less,
wherein a void cross-sectional area ratio in entire particle cross section which is a ratio of cross-sectional area of the void present in the cross section of the secondary particle to the cross-sectional area of the secondary particle is 1% or more and 20.6% or less, and
wherein the positive electrode active material has a N-methylpyrrolidone liquid retention ratio of 18% or more, wherein the N-methylpyrrolidone liquid retention ratio is determined by equation (1) below:

N-methylpyrrolidone liquid retention (%)=[C/B]×100     (1), wherein B is a N-methylpyrrolidone absorption amount when the positive electrode active material in a dried form is impregnated with N-methylpyrrolidone, and C is a N-methylpyrrolidone content when the positive electrode active material impregnated with N-methylpyrrolidone is dried at 60° C. for 30 minutes,
wherein a crystal structure of the positive electrode active material of the lithium secondary battery is a hexagonal crystal structure, and
wherein the positive electrode active material for a lithium secondary battery is represented by composition formula (I) below:

Li[Li$_x$(Ni$_a$Co$_b$Mn$_c$M$_d$)$_{1-x}$]O$_2$     (I), wherein −0.1≤x≤0.2, 0<a≤1, 0≤b≤0.4, 0≤c≤0.4, 0≤d≤0.1, a+b+c+d=1, and M represents at least one element selected from the group consisting of Fe, Cr, Cu, Ti, B, Mg, Al, W, Mo, Nb, Zn, Sn, Zr, Ga and V.

12. The positive electrode active material according to claim 11,
wherein a ratio of a void cross-sectional area ratio in a middle portion of the secondary particle to a void cross-sectional area ratio in a surface portion of the secondary particle is 1.6 or more and 25.0 or less,
wherein the void cross-sectional area ratio in the surface portion is a ratio of cross-sectional area of the void in the surface portion to cross-sectional area of the surface portion of the secondary particle,
wherein the surface portion is an area excluding the middle portion which is a circle having a radius of A/4 wherein A is an average particle diameter, $D_{50}$, of the positive electrode active material as a whole measured by laser diffraction type particle size distribution measurement, and a center of the circle is the centroid of cross section of the secondary particle calculated by image processing,
wherein the void cross-sectional area ratio in the middle portion is a ratio of cross-sectional area of the void in the middle portion to the cross-sectional area of the middle portion of the secondary particle.

* * * * *